United States Patent [19]

Hwang et al.

[11] Patent Number: 4,858,817
[45] Date of Patent: Aug. 22, 1989

[54] GRAPHIT-CERAMIC RF FARADAY-THERMAL SHIELD AND PLASMA LIMITER

[75] Inventors: David L. Hwang, Princeton Junction; Joel C. Hosea, Princeton, both of N.J.

[73] Assignee: The United States of America as represented by the Department of Energy, Washington, D.C.

[21] Appl. No.: 491,639

[22] Filed: May 5, 1983

[51] Int. Cl.$^4$ ............................................. B23K 31/02
[52] U.S. Cl. ................................... 228/122; 228/121; 228/263.12
[58] Field of Search .............. 228/122, 263.11, 263.12, 228/220, 121, 212; 269/254 R

[56] References Cited

U.S. PATENT DOCUMENTS

| | | | |
|---|---|---|---|
| 2,202,894 | 6/1940 | Bihler | 269/254 R |
| 2,546,458 | 3/1951 | Launder | 269/254 R |
| 2,970,833 | 2/1961 | Stevens | 269/254 R |

Primary Examiner—Kurt Rowan
Attorney, Agent, or Firm—Judson R. Hightower; Richard E. Constant

[57] ABSTRACT

The present invention is directed to a process of brazing a ceramic material to graphite. In particular, the brazing procedure is directed to the production of a novel brazed ceramic graphite product useful as a Faraday shield.

8 Claims, 2 Drawing Sheets

GRAPHIT-CERAMIC RF FARADAY-THERMAL SHIELD AND PLASMA LIMITER

BACKGROUND OF THE INVENTION

The present invention is directed to a brazing procedure for joining a ceramic or glass material (e.g., $Al_2O_3$ or Macor) to graphite. In particular, the present invention is directed to a novel brazing procedure for the production of a brazed ceramic graphite product useful as a Faraday shield. The brazed ceramic graphite Faraday shield of the present invention may be used in Magnetic Fusion Devices (e.g., Princeton Large Torus Tokamak) or other high temperature resistant apparatus.

Radio frequency (RF) wave heating is a very attractive method for bringing plasma to ignition temperature in a magnetic fusion device from both the physics and technological standpoints. In a hot magnetized plasma, there are a wide range of energy absorption mechanisms of the electromagnetic wave offered by the plasma dielectric properties; there are several frequency ranges where plasma heating is possible. Each RF heating scheme selectively couples energy to a particular species of charged particles (ions and/or electrons) with the desired spatial deposition profile, to certain velocity distributions (Maxwellian or non-Maxwellian), and in either the perpendicular or parallel degree of freedom relative to the magnetic field.

Besides plasma heating, RF waves have many other potentially important uses in magnetic fusion devices, such as assisting initial discharge breakdown, driving a plasma current, controlling the temperature or current profiles, decreasing unwanted impurities, etc. To date, there are three major frequency ranges where plasmawave interaction are found to be strong, the ion cyclotron (ICRF), the lower hybrid (LHRF), and the electron cyclotron (ECRF) ranges. Both ICRF and LHRF ranges are below 10 GHz, so high power generator and transmission systems are available commercially. The ECRF range for future magnetic fusion devices, however, is between 100-200 where high power sources still need to be developed.

The advantages of RF systems in reactor environments are that wave launchers can be thermally shielded from the plasma and the RF sources can be placed behind radiation shields to avoid direct neutron streaming. This makes maintaining and operating the high-power system very convenient. Furthermore, since very efficient RF generators, transmission systems, and wave couplers exist over most of the RF range, the technological development needed is minimized. For RF heating schemes, the generator, transmission, and coupler systems still require technological studies; while the problem of wave absorption is in the primary area of interests of physics. In most instances, the engineering problems can be addressed independently of the physics questions by utilizing existing technology.

The wave launchers depend on the frequency range, the type of plasma wave, and the various plasma parameters. For the ICRF range, in experiments using present day machines, inductive coil antennas have been used because of low frequency ($<100$ MHz) (i.e., the wavelength is much larger than the port dimensions on the devices.) As we approach magnetic fusion reactors, the dimensions of these devices become much larger, so it becomes feasible to use waveguide launchers for ICRF waves. The present LHRF heating experiments use frequencies between 800 MHz and 5 GHz where waveguide couplers can be employed, and the ECRF range is between 28 and 60 GHz where waveguides are used exclusively.

For the ICRF range, vacuum triode and tetrode tubes are available with power levels of 600-kW CW or 1.2-MW pulsed per tube. These tubes can be used in high-gain amplifiers with up to 85% efficiency (class D), and component costs in this frequency range are lower than other heating schemes.

In the LHFR regime, high-power klystrons are available with ~50 kW per tube CW and 200 kW per tube pulsed, and the typical efficiency of these klystrons is between 50-60 percent. Another type of high-power source (~1 MW) that can be used in this frequency range is the gyrocon which has very high efficiency (~95 percent) but much lower gain (~<13 dB), so more amplifier stages will be required. Recent gyrocon development has extended the frequencies of these tubes to the 100-200 MHz range which is applicable to higher harmonic ion cyclotron heating.

Gyrotrons in the 28- to 60-GHz range with 100- to 200-kW pulsed or CW capability are presently used in tokamak and Elmo Bumpy Torus (EBT) experiments. 94GHz gyrotrons are being tested in the USSR on the T-10 tokamak with 200 kW of pulsed power. However, in reactors, the ECRF range is much higher (120 GHz$<$f$<$200 GHz) where high-power wave generators do not exist at this time. Therefore ECRF schemes, differing from the other two regimes, face a wave generator development requirement as well as plasma physics questions.

The present invention is directed to Faraday shields for magnetic fusion reactors which utilize ICRF principles. For a detailed discussion of these principles see Hwang et al, *Radio Frequency Wave Applications in Magnetic Fusion Devices*, Proc. of the IEEE, Vol. 69, No. 8, August 1981, pages 1030-1043.

Looking ahead to reactor applications of ICRF, the wave couplers, whether they are composed of waveguides, loops, or a hybrid configuration, must be designed to withstand the severe radiation and thermal environment. Design considerations can be classified into three areas: material selection, RF design, and installation convenience. The latter two points are more machine dependent since the port size and location determine the coupler shape and dimension; the materials problem, on the other hand, is more general. Recently at Princeton University, material selection and testing for near reactor requirements in radiation, thermal and RF power capability has begun in special testing facilities. Once suitable couplers are developed and tested, they can be placed on present day tokamaks to evaluate their wave generation properties.

Reactor material considerations can be divided into thermal properties and susceptibility to radiation damage. The projected thermal flux at the reactor first wall is 10-15 MW/$M^2$, so some part of the RF coupler must act as a thermal shield to protect the rest of the structure. The estimated neutron fluence from a reactor is greater than $10^{16}$ N/cm$^2$/s; therefore, the materials used in the coupler must be able to withstand a total dosage of over $10^{23}$ N/cm$^2$ in a three month period. In the couplers the integrity of mechanical supports, conductors, and insulators must be preserved within the necessary lifetime.

For the fast magnetosonic wave, it would be of great advantage if the Faraday shields could be used as the thermal shield for the conductors in loop couplers. Moreover, if the Faraday shield can be made vacuum tight, it could isolate the coupler from the plasma and local gas, thus minimizing RF breakdown problems in the launches. Accordingly, the development of a Faraday shield structure which would provide these properties would be a significant advance in the techonology.

SUMMARY OF THE INVENTION

It is the primary object of the present invention to provide a novel brazing process for joining ceramic or glass materials to graphite.

It is another object of the present invention to provide a novel brazing process for the formation of a Faraday shield.

It is still another object of the present invention to provide a new and improved Faraday shield useful in magnetic fusion reactor design.

It is a further object of the present invention to provide a novel brazing process for bonding together layers of graphite conductors and ceramic or glass insulators.

It is a still further object of the present invention to provide a novel process for the formation of Faraday shield wherein layers of graphite conductors are bonded to ceramic insulators.

It is another object of the present invention to provide a novel process for the formation of a high temperature thermal shield comprising graphite layers bonded to ceramic or glass layers.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the process of the present invention comprises locating a ceramic and graphite material on a substrate and positioning a brazing alloy comprising Cu, Ti and Ag between these materials forming a layered product. Pressure is applied to the layered product in an amount sufficient to maintain these materials in their relative position on the substrate and insufficient to prevent movement of these materials as a result of the thermal expansion and contraction which occurs during the subsequent heating and curing steps. The layered product, under pressure, is heated in a vacuum to a temperature sufficient for brazing and the product is maintained at this temperature until brazing occurs. The brazed product is cooled to room temperature and recovered.

In a preferred embodiment of the process of the present invention the substrate for the ceramic and graphite materials is positioned at an angle of about 45° with respect to the vertical.

In a further preferred embodiment of the present invention the pressure is applied by a means selected from the group consisting of a dead weight and a spring bias weight.

In a still further preferred embodiment of the present invention the layered product is heated in a vacuum of about $10^{-6}$ Torr to a temperature of between about 800°–850° C. and maintained at this temperature for about 3 to 10 minutes.

In another preferred embodiment of the process of the present invention the brazed product is slowly cooled to room temperature over a period of about 9 to 12 hours.

In another aspect of the present invention, a brazing process is provided for producing a Faraday shield comprising locating a ceramic and graphite material on a substrate and positioning a brazing alloy comprising Cu, Ti, and Ag between the materials producing a layered product. The layered product is subjected to pressure in an amount sufficient to substantially maintain the materials in their relative position on the substrate and insufficient to prevent movement of the materials as a result of thermal expansion and contraction. The layered product, under pressure, is heated in a vacuum to a temperature sufficient for brazing and maintained at this temperature until brazing occurs. The brazed product is slowly cooled to room temperature and recovered.

In a preferred embodiment of this aspect of the present invention, the substrate for the ceramic and graphite materials is positioned at an angle of about 45° with respect to the vertical.

In a further preferred embodiment of this aspect of the present invention the pressure is applied by a means selected from the group consisting of a dead weight and a spring bias weight.

In a still further preferred embodiment of the present invention the layered product is heated in a vacuum of about $10^{-6}$ Torr to a temperature of between about 800°–850° C. and maintained at this temperature for about 3 to 10 minutes.

In another preferred embodiment of this aspect of the present invention the brazed Faraday shield is slowly cooled to room temperature over a period of about 9 to 12 hours.

In a still further aspect of the present invention, A Faraday shield is provided comprising a brazed product consisting of a ceramic material, a graphite material, and a brazing alloy consisting essentially of Cu, Ti, and Ag intermediate these materials.

In a further aspect of the present invention, the brazing alloy consists essentially of about 65% Ag, about 26.7% Cu and about 4.5% Ti.

In another aspect of the present invention the graphite material is selected from the group consisting of ATJ, Poco, and Pyrolitic.

In still another preferred aspect of the present invention the ceramic material is selected from the group consisting of $Al_2O_3$, glass (Macor) and $Y_3Al_5O_{12}$.

The Faraday shields constructed according to the brazing process of the present invention are capable of having a significant impact on magnetic fusion reactor design. The overlapping graphite pieces or layers bonded to the ceramic pieces or layers act as a thermal shield to protect the ceramic shield as well as the metallic antenna of the ICRF. Individual brazed pieces produced by the method of the present invention have been tested by means of an electron gun capable of delivering 40 MW/M² of thermal flux on the graphite surface. Examination of these pieces after testing showed that the graphite brazed joint and the ceramic insulator were not damaged. At this thermal flux level, the Faraday shield may even meet the requirements of the limiters.

BRIEF DESCRIPTION OF THE DRAWINGS

The accompanying drawings, which are incorporated in and form a part of the specification, illustrate a preferred embodiment of the present invention and together with the description, serve to explain the principles of the invention. In the drawing.

Reference is now made in detail to the present preferred embodiment of the invention, an example of which is illustrated by the accompanying drawings.

DETAILED DESCRIPTION OF THE INVENTION

Figure 1:
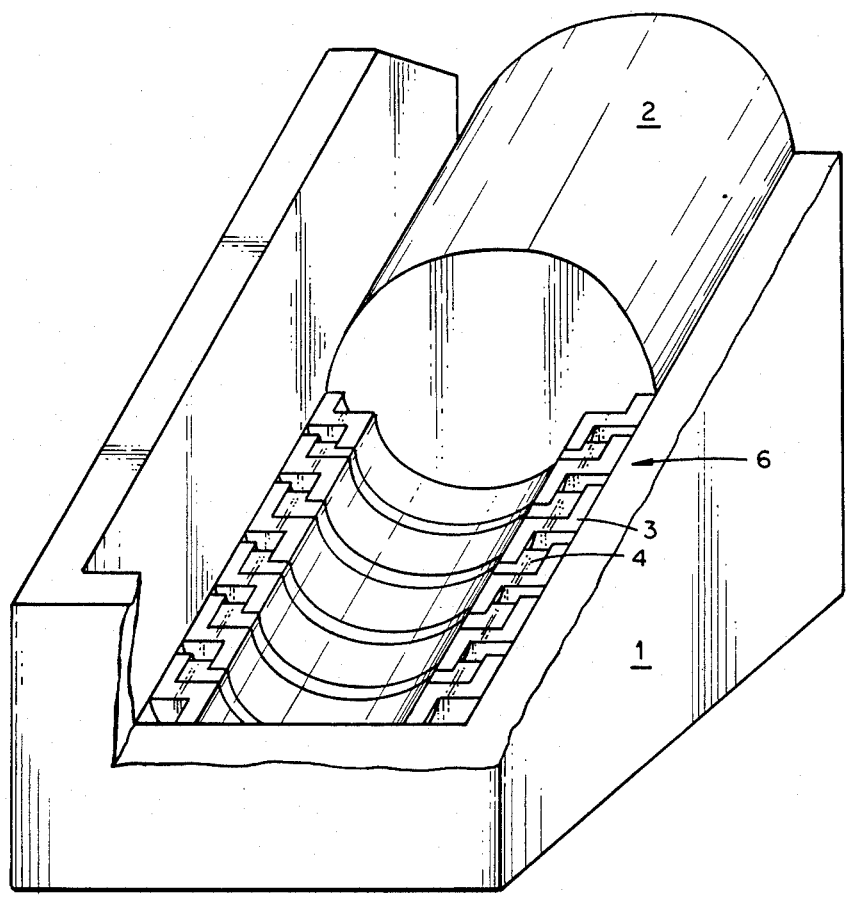
FIG. 1 is a perspective view of a preferred apparatus used in the fabrication of a Faraday shield by the brazing process of the present invention.

In particular, the brazing process of the present invention comprises locating a graphite material on substrate or holder 1 shown in FIG. 1. A brazing alloy consisting essentially of Cu, Ti and Ag is superimposed upon the graphite material and the ceramic material is placed upon the brazing alloy. These steps can be repeated until the desired number of layers have been placed on the substrate. A dead weight is then placed into position on the substrate applying sufficient pressure upon the layered product to maintain the material in their relative position and insufficient to prevent movement of these materials as a result of the thermal expansion and contraction which occurs during subsequent heating and curing steps. The layered product, under pressure, is now heated in a vacuum to a temperature sufficient for brazing and maintained at this temperature until brazing occurs. The brazed product (i.e. Faraday shield) is slowly cooled to room temperature and recovered.

With reference to FIG. 1, a preferred embodiment of the present invention comprises placing the ceramic 4 and graphite 3 material in semi-circular holder 1. The brazing alloy (not shown), preferably in flexible sheet form, is laid between the ceramic and graphite pieces. Dead weight 2 ($\simeq$10-15 lbs.) is positioned on the layered product to apply the required pressure. Ceramic 4 and graphite 3 material are preferably preshaped to conform to the configuration of holder 1. For Faraday shields of other shapes besides circular, the holder can be modified to the proper design.

Holder 1 is preferably designed in order that the ceramic material, graphite, and brazing alloy are positioned at a 45° angle to the vertical. Weight 2 is likewise positioned at this angle. In addition, holder 1 is made of graphite to ensure that the thermal contraction or expansion of holder 1 will not affect the lowermost layer of the brazed product (i.e., graphite).

Holder 1 may be positioned in a vacuum apparatus prior to loading with the graphite, ceramic and brazing alloy, or the loaded holder may be placed into a vacuum apparatus subsequent to loading. The vacuum apparatus (not shown) is conventional and does not form a part of this invention.

The layered product, in holder 1, is heated to a temperature of between about 800°-850° C. at a rate of about 200° to 275° C./hr under vacuum conditions of about $10^{-6}$ Torr. The product is maintained at this temperature for a period of about 3 to 10 minutes enabling the brazing alloy to melt and bond the ceramic layers to the graphite layers. Illustrative of the brazing alloy utilized is a Ticusil mixture comprising Cu, Ti and Ag. Various combinations of these ingredients have been found to be suitable in the practice of the present invention. Alloys having 40 to 50% Ti and as high as 80% Ti are suitable. However, it is preferred that the brazing alloy mixture consists essentially of about 65% Ag, 26% Cu and 4.5 Ti alloy coated with Ti-hydride paint.

The brazed product is slowly cooled to room temperature over a period of about 9 to 12 hours. The vacuum is released and the brazed product is recovered from holder 1 by removing weight 2. The resulting brazed product (semicircular configuration) can be utilized as a Faraday shield.

Various types of graphite materials such as ATJ, Poco, and Pyrolitic are suitable in the practice of the process of the present invention. In addition, different types of ceramic materials such as $Al_2O_3$ and Macor have been utilized in this process. In particular, newly developed ceramic insulators, such as $Y_3Al_5O_{12}$, having projected lifetimes in the 14-MeV neutron environment are envisioned as possibly candidates for this procedure.

Figure 2:
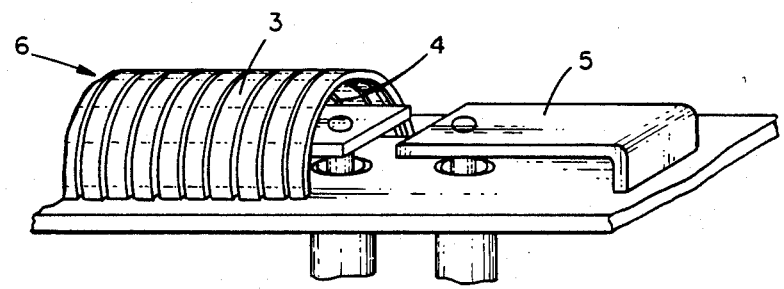
FIG. 2 is a perspective illustration of an ICRF antenna with graphite strips acting as a Faraday shield and thermal shield.

FIG. 2 is a perspective view of an ICRF antenna with the brazed product acting as both a Faraday and thermal shield. Graphite piece 3 and ceramic piece 4 joined by brazing process of the present invention are located about antenna 5. Antenna 5 is made from aluminum, and by itself, does not form any part of the present invention. The ICRF antenna illustrated in FIG. 2 is utilized in conventional magnet fusion reactor devices.

Figure 3:
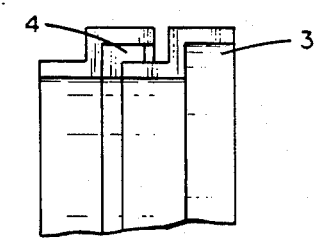
FIG. 3 is a cross-sectional view of the brazed ceramic graphite product suitable for use as the Faraday shield illustrated in FIG. 1.

FIG. 3 is a cross-sectional view of the Faraday shield 6 shown in FIG. 2. FIG. 2 illustrates the laminar arrangement of the brazed product of the present invention comprising graphite pieces 3 and ceramic pieces 4.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A process for brazing a graphite material to a ceramic or glass material comprising:
    a. locating said ceramic or glass substrate material and graphite substrate material on a support surface at an angle of about 45 degrees with respect to the vertical and positioning a brazing alloy comprising Cu, Ti, and Ag between said materials forming a layered product;
    b. applying pressure to said product in an amount sufficient to maintain substantially said materials in their relative position in the support surface and insufficient to prevent movement of said materials as a result of the thermal expansion and contraction which occurs during the subsequent heating and cooling steps;

c. heating said product in a vacuum to a temperature sufficient for brazing and maintaining said product at this temperature until brazing occurs whereby said materials expand as a result of thermal expansion during heating;

d. cooling said brazed material to room temperature whereby said brazed product contracts upon cooling;

e. recovering said brazed product.

2. The process of claim 1 wherein said pressure is applied by positioning a weight on said layered product.

3. The process of claim 2 wherein step (c) comprised heating said product in a vacuum of about $10^{-6}$ Torr to a temperature of between about 800°–850° C. and maintaining said product at this temperature for about 3 to 10 minutes.

4. The process of claim 3 wherein step (d) comprises slowly cooling said product to room temperature over a period of about 9 to 12 hours.

5. A process for producing a Faraday shield comprising;

a. locating a ceramic substrate material or glass and graphite substrate material on a support surface at an angle of about 45 degrees with respect to the vertical and positioning a brazing allow comprising Cu, Ti, and Ag between said materials forming a layered product;

b. applying pressure to said product in an amount sufficient to maintain substantially said materials in their relative position on the substrate and insufficient to prevent movement of said materials as a result of the thermal expansion and contraction which occurs during the subsequent heating and cooling steps;

c. heating said product in a vacuum to a temperature sufficient for brazing and maintaining said product at this temperature until brazing occurs whereby said materials expand as a result of thermal expansion during heating;

d. cooling said Faraday shield to room temperature whereby said brazed product contracts upon cooling;

e. recovering said brazed product.

6. The process of claim 5 wherein said pressure is applied by positioning a weight on said layered product.

7. The process of claim 6 wherein step (c) comprises heating said product in a vacuum of about $10^{-6}$ Torr to a temperature of between about 800°–850° C. and maintaining said product at this temperature for about 3 to 10 minutes.

8. The process of claim 7 wherein step (d) comprises slowing cooling said product to room temperature over a period of about 9 to 12 hours.

* * * * *